J. F. SIGRIST.
PROCESS OF MAKING HOLLOW CANDY ARTICLES.
APPLICATION FILED DEC. 6, 1907.
927,435.
Patented July 6, 1909.
2 SHEETS—SHEET 1.
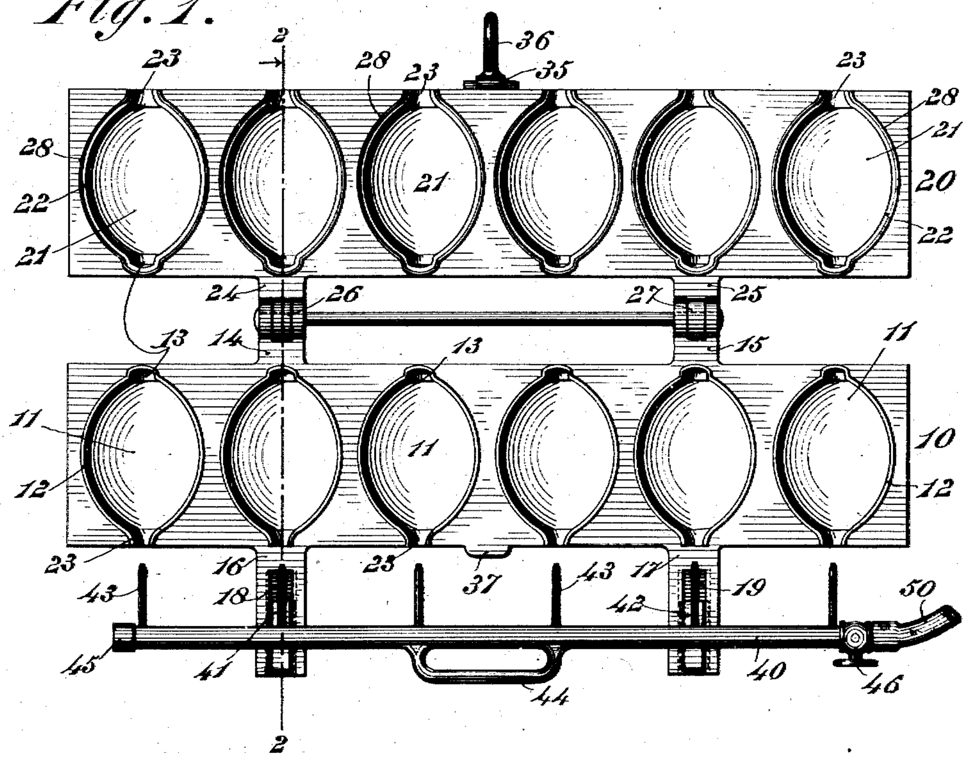
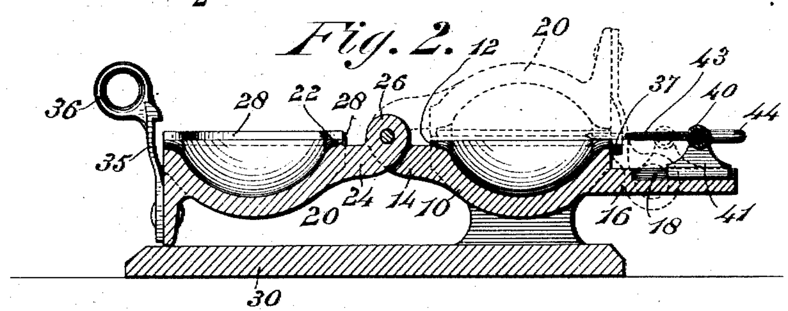
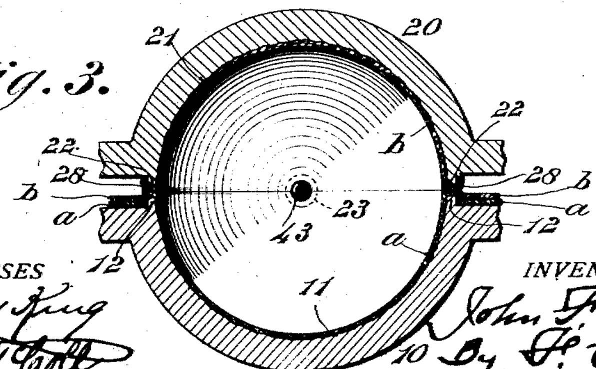
WITNESSES
Harry King
S. M. McColl.
INVENTOR
John F. Sigrist
By F. C. Somes
Attorney J. F. SIGRIST.
PROCESS OF MAKING HOLLOW CANDY ARTICLES.
APPLICATION FILED DEC. 6, 1907.
927,435. Patented July 6, 1909.
2 SHEETS—SHEET 2.
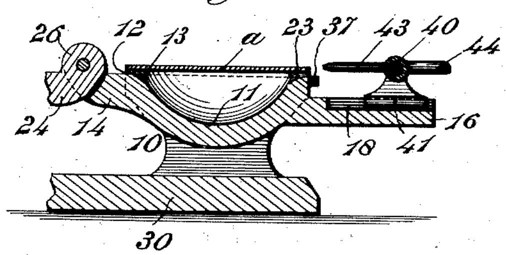
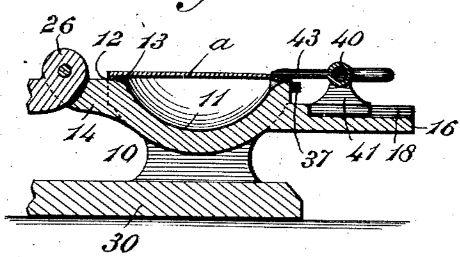
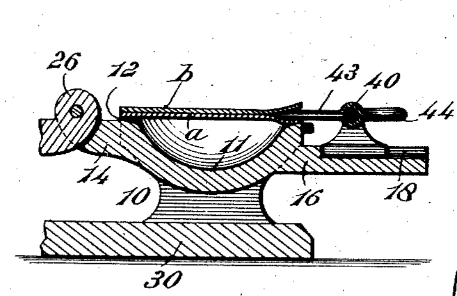
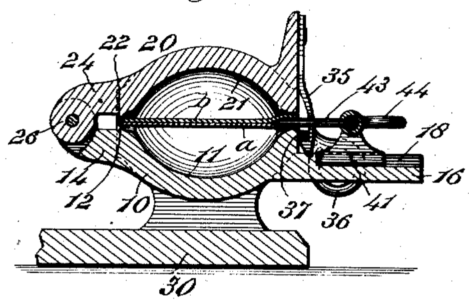
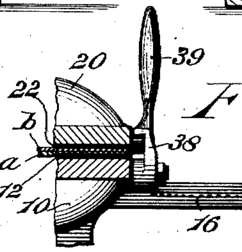
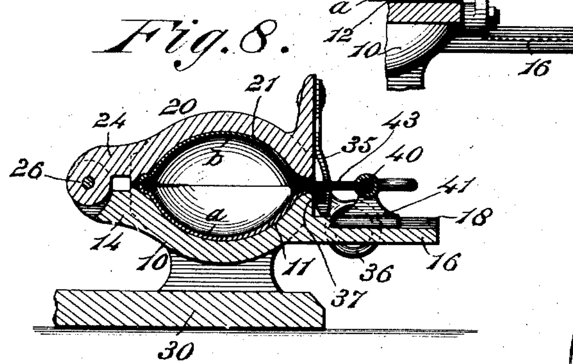
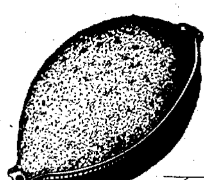
WITNESSES
Harry King
S. M. McColl,
INVENTOR
John F. Sigrist
By P. C. Somes,
Attorney

UNITED STATES PATENT OFFICE.

JOHN FREDERICK SIGRIST, OF NEW YORK, N. Y.

PROCESS OF MAKING HOLLOW CANDY ARTICLES.

No. 927,435. Specification of Letters Patent. Patented July 6, 1909.

Application filed December 6, 1907. Serial No. 405,345.

*To all whom it may concern:*

Be it known that I, JOHN FREDERICK SIGRIST, a citizen of the United States of America, residing in the borough of Brooklyn, in the city of New York, in the county of Kings, in the State of New York, have invented certain new and useful Improvements in Processes of Making Hollow Candy Articles, whereof the following is a specification.

This invention relates to the production of ornamental candy articles representing fruits, animals, and various other things.

Candy toys have heretofore been made by molding candy material in solid blocks. This process is expensive and unsatisfactory, as it requires a large quantity of such material and leaves the product in a form which is inconvenient to eat. Candy articles have also been made in hollow form by pouring hot liquid candy material into molds, permitting it to stand until on cooling a shell is cast around the inner surface of the mold, and then pouring out the interior liquid. This process is slow and expensive.

The object of this invention is to produce handsome candy articles of comparatively large size from a small quantity of material and in a rapid and economical manner.

The invention comprises working and shaping of pliable candy into sheets; laying of one sheet over another in a mold; sealing said sheets together by pressure on a line which constitutes an outline of the article to be produced; and expanding said sheets within said marginal seal into contact with the mold by compressed air or other fluid.

The accompanying drawings represent one form of molding apparatus for carrying out this process, the molds thereof being adapted for the making of hollow candy articles in imitation of or representing lemons.

Figure 1 represents a plan view in open position of a multiple mold-apparatus wherein a plurality of articles may be molded simultaneously. Fig. 2 represents a transverse section thereof on line 2—2 of Fig. 1. Fig. 3 represents on an enlarged scale a section at right angles with Fig. 2, showing a transverse section of one of the individual molds in closed position and having a molded article therein. Fig. 4 is designed to illustrate one step of the process and shows a transverse section of the lower half of the molding apparatus (being a longitudinal section through an individual mold) and a plastic sheet of candy laid thereon overlapping the edge of said mold. Fig. 5 shows a similar section, the nozzle of the inflating apparatus being in position over the plastic sheet aforesaid. Fig. 6 shows a similar section and illustrates another step of the process in which a second plastic sheet of candy is laid over the first sheet aforesaid, the edge of the second sheet lying over said nozzle. Fig. 7 represents a transverse section through the molding apparatus in closed position and illustrates the completion of another step in the process, in which the blanks to form the product are severed from the sheets aforesaid and the edges of said blanks are compressed into sealing contact with each other. Fig. 8 represents a similar section of the molding apparatus in closed position and illustrates another step of the process in which the blanks aforesaid are expanded into contact with the upper and lower faces of the mold by fluid pressure. Fig. 9 represents a perspective view of a complete candy article in the form of a lemon. Fig. 10 represents a fragment of one of the molds provided with a mechanism for forcing the two parts of the mold together to effect the pressing or sealing operation. Fig. 11 represents a face elevation of a cam constituting a part of the mold closing mechanism shown in Fig. 10.

The same reference numbers indicate corresponding parts in all the figures.

Any suitable molding apparatus may be employed for carrying out this process. The drawings illustrate a convenient form of apparatus for this purpose. This apparatus comprises a lower plate 10 provided with a plurality of concave half molds 11, each provided with a raised marginal lip 12, and a top mold plate 20 provided with a corresponding number of concave half molds 21, also provided respectively with marginal lips 22. These molds are disposed transversely of their mold plates and provided at their outer ends with recesses 13 adapted to form a knob on the imitation lemon to indicate or suggest the blossom end thereof. The molds are preferably open on their outer ends at the front edges of the mold plates, their lips 12 and 22 curving outward at said ends and terminating at said edges, forming tapering mouths 23 for introducing the nozzles of the blowing apparatus. The lower mold plate 10 is mounted on a base plate 30 or other suitable support and provided on its rear edge with lugs 14 and 15, and on its front with horizontal arms 16 and 17 having dovetailed or other guideways 18 and 19.

The upper mold plate 20 is provided at its rear edge with lugs 24 and 25 and is connected by means of hinges 26 and 27 with the lugs of the lower plate 10. The upper plate 20 is adapted to close over the lower plate 10 in such manner that the lips 22 of the molds 21 come over the lips 12 of the molds 11 leaving a space between them as shown in Figs. 3, 7 and 8. Each of the half molds, as 21 for instance, is provided with a knife blade 28 attached to the outer edge of the lip 22 and adapted to shut over the outer edge of lip 12 when the mold is closed, as shown in Fig. 3.

Means are provided for closing the molding apparatus with more or less force. Any suitable means may be employed for this purpose. The means shown in Figs. 1, 2, 6, and 7 comprise a spring catch 35 secured to the front of the mold plate 20 and provided with a handle 36, said catch being adapted to engage a lug 37 on the mold plate 10, and hold the mold in closed position.

Another form of closing device is shown in Figs. 10 and 11, in which a cam lever 38 pivoted to the lower plate 10 engages a stud or projection on the upper plate 20. The swing of the cam lever in one direction, after the top plate is swung over the bottom plate, forces the former toward the latter; and when swung in the other direction said upper plate is released.

Means are provided for forcing a fluid between the plastic blanks of candy within the molds to inflate and expand them into contact with the inner faces of the mold. Any suitable apparatus may be employed for this purpose. The apparatus illustrated comprises a pipe 40 mounted on blocks 41 and 42 which are movable in the guideways 18 and 19 of the arms 16 and 17. This pipe is provided on its rear side with a series of horizontal nozzles 43 disposed opposite the necks or mouths 23 of the molds, and on its front face with a handle 44 by which it is moved toward or from the molds. The pipe is closed at one end by a cap 45 or otherwise, and provided with a cock 46 near the other end. A flexible or other supply pipe 50 is connected with the pipe 40 and delivers compressed air, gas, water or other fluid under pressure from a reservoir or other source of supply, not shown, to said pipe 40.

In carrying out this process a candy, which is hard when finished, composed preferably of sugar boiled under a temperature preferably of about 300° Fah., or thereabout, is subjected, while in a warm plastic condition, to a pulling operation in any suitable or ordinary manner. This working of the candy produces a gloss thereon. After the pulling operation the candy is formed into a smooth flat sheet of suitable thickness, say one-eighth inch, more or less; said sheet being preferably rubbed with buckskin. Then a sheet *a* of said candy in a warm plastic state is laid over the plate 10 of an open mold, as shown in Fig. 4. Then the pipe 40 is moved inward and the nozzles 43 enter the mouths 23 of the molds and overlie the edge of said candy sheet at said mouths, as shown in Fig. 5. Then a similar candy sheet *b* is laid over the sheet *a* on the mold, said sheet *b* overlying the nozzles 43 of the inflating apparatus, as shown in Fig. 6. Then the mold is closed and the parts of said sheets designed to form the molded articles are severed from the remaining portions of said sheets *a* and *b* by the knives 28, the edges of such severed portions are compressed and sealed together by means of the lips 12 and 22, and said sheets are forced tightly into contact with the injecting nozzles. Then the cock 46 in pipe 40 is opened and compressed air or other fluid under pressure is discharged into the mold between the sheets or blanks *a* and *b* and the latter thereby expanded within their sealed margins into contact with the inner faces of the mold. The mold is comparatively cool, that is its temperature is below that of the melting or the softening point of the candy. The air injected is also below said point in temperature and the mold and air both act to cool the candy. The candy becomes cooled and hardened sufficiently when the inflation is complete, or soon thereafter, to permit removal. Then the molds are opened, the blown articles taken out, and the operation repeated.

This invention provides at small cost ornamental candy articles of large size which can be sold by the piece or by the pound. These articles may be made in various forms and the hard candy of which they are composed may have any desired flavoring and coloring.

I claim as my invention—

The art of making hollow candy articles which consists in clamping superposed sheets of hard candy in a warm plastic condition between cool mold sections, injecting a fluid in a cool state under pressure into the mold between said sheets while in warm plastic condition, and forcing said sheets by means of said fluid under pressure into contact with the cool surfaces of the mold, whereby the article is formed and hardened.

JOHN FREDERICK SIGRIST.

Witnesses:
H. P. DUNGAN,
H. H. HAINES.